United States Patent [19]
Miller

[11] 3,908,953
[45] Sept. 30, 1975

[54] SUPPORT APPARATUS FOR A SEAT
[76] Inventor: Herscheal W. Miller, 432 Fairmount St., Davenport, Iowa 52802
[22] Filed: Dec. 7, 1973
[21] Appl. No.: 422,659

[52] U.S. Cl. ............................. 248/421; 248/399
[51] Int. Cl.² ....................................... F16M 13/00
[58] Field of Search ...... 74/520, 521; 248/277, 399, 248/400, 421

[56] References Cited
UNITED STATES PATENTS

| | | | |
|---|---|---|---|
| 1,529,138 | 3/1925 | Kuentzel | 248/399 |
| 2,736,568 | 2/1956 | Martin | 74/521 X |
| 3,338,543 | 8/1967 | Stuckenberger et al. | 248/399 |
| 3,374,981 | 3/1968 | Stuckenberger et al. | 248/400 |
| 3,638,896 | 2/1972 | Lindstrom | 248/399 |

FOREIGN PATENTS OR APPLICATIONS

| | | | |
|---|---|---|---|
| 878,714 | 10/1961 | United Kingdom | 248/421 |
| 8,013 | 5/1890 | United Kingdom | 248/421 |

*Primary Examiner*—Roy D. Frazier
*Assistant Examiner*—Lawrence J. Staab

[57] ABSTRACT

Support apparatus for maintaining a seat level during vertical movement of the seat comprising articulated linkages mounting a support unit for the seat on a base, and with strap devices for maintaining the linkages in predetermined angular relationship, and with link units interconnected between the linkages and the support unit for retaining the support within a vertical plane while maintaining the support level.

4 Claims, 3 Drawing Figures

U.S. Patent    Sept. 30,1975    3,908,953
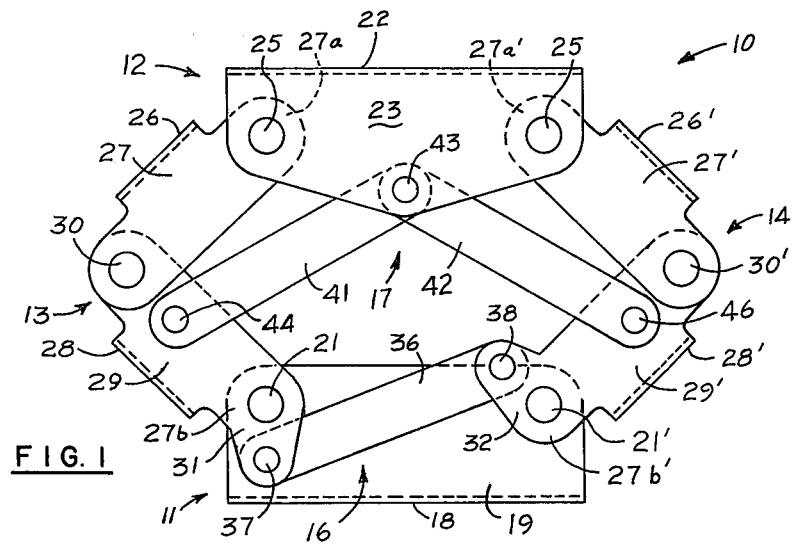
FIG. 1
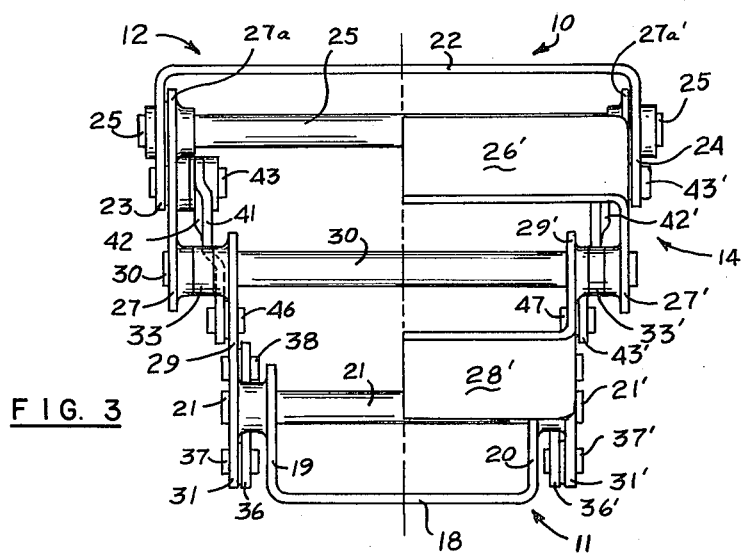
FIG. 2
FIG. 3

3,908,953

SUPPORT APPARATUS FOR A SEAT

BACKGROUND

There are innumerable good seat supports — such as farm tractor seats, presently available, and applicant has developed several of these himself. Certain of these are shown in U.S. Pat. Nos. 2,946,373; 2,984,290; 3,134,454; 3,144,270; 3,339,906 and 3,633,864. Most of these supports are based on either a scissors or a parallelogram principle, and each has certain drawbacks.

The scissors arrangement lacks control by the linkage mechanism over the tilting fore and aft of the seat, or of the pitch; and also leaves an open end which is inadvisable in use involving dust and dirt. The parallelogram arrangement has fairly good control over pitch, but permits longitudinal movement of the seat relative to the base thereof which causes arcuate movement of the seat. This arcing can be quite objectionable to the seat occupant. Additionally, in the latter system the spring unit must perform a more difficult task as it is not directly under the seat.

It is to the overcoming of the objectionable facets of the aforementioned systems that the present invention is directed.

SUMMARY

This invention relates to an apparatus for supporting a seat in a level condition and within a vertical plane, which comprises a base means for fastening the apparatus to a vehicle; a support means for supporting a seat thereon; identical first and second articulated linkage units pivotally interconnecting common ends of the support means and the base means in vertically adjustable spaced relation; strap means pivotally interconnecting the lower ends of the linkage units for maintaining the linkage units in predetermined angularly related positions during vertical movement of the support means; and link means pivotally interconnecting the linkage units to the support means therebetween, whereby to maintain the support means level and parallel to the base means and within a vertical plane at all times.

It is an object of this invention to provide a new and novel support apparatus for a seat.

It is another object of this invention to provide an improved support apparatus capable of supporting a seat in a level manner.

Another object of this invention is to provide an apparatus for maintaining a seat level at all times during vertical movement thereof, and further wherein the seat does not move arcuately about its support or longitudinally relative thereto during said movement.

Yet another object of this invention is to provide apparatus including a pair of articulated, oppositely acting linkage units which are held in a predetermined angular relationship at all times during vertical movement of a seat held thereby, and wherein another link unit maintains the seat level and retains it at all times in the same vertical plane.

Still another object of this invention is to provide an apparatus capable of attaining the above identified objectives which is economical, effective and easily serviced.

BRIEF DESCRIPTION OF THE DRAWINGS

FIG. 1 is a side elevational view of the preferred embodiment of the seat apparatus of this invention;

FIG. 2 is a plan view thereof, with one half of the view having the upper portions removed; and FIG. 3 is an elevational view of an end thereof, with one half having the front portion removed.

DESCRIPTION OF THE PREFERRED EMBODIMENT

A preferred embodiment of the support apparatus of this invention is illustrated generally at 10 in FIG. 1, and comprises base means 11 adapted to be secured to either a stationary structure of a vehicle or to an adjustable structure which will remain relatively horizontal regardless of the vehicle position, within reason of course; support means 12 adapted to have a seat (not shown) attached thereto and vertically movable relative to said base means 11; first articulated linkage unit 13 and identical second articulated linkage unit 14 pivotally mounting the support means 12 on the base means 11; strap means 16 pivotally connecting lower ends of the first and second units 13 and 14; and link means 17 for pivotally interconnecting the support means 12 to both first and second units 13 and 14.

The arrangement is such that the support means 12 for the seat may move vertically relative to the base means 11, controlled by any conventional spring means (not shown) interposed therebetween, such as a compression spring, torsion spring, or air spring, and is maintained in a horizontal position by the function of the link means 17. Additionally, the link means 17 retains the center of the support means 12 within a vertical plane which bisects the center of the base means 11 such that there is no movement of the support means 12 longitudinally of the base means 11 either fore or aft. Further, the first and second articulated linkage units 13 and 14 are maintained in predetermined angularly related positions during vertical movement of the support means 12 due to the function of the strap means 16, as will be seen more clearly hereinafter.

In particular, the base means 11 comprises a U-shaped structure having a base plate 18 (FIG. 3) and a pair of upstanding, parallel side plates 19 and 20. The side plates 19 and 20 are connected by a pair of connecting bars 21 the outer ends of which extend beyond the side plates.

The support means 12 also comprises a U-shaped member having a flat upper portion 22 (FIG. 3), of a length longer than that of said base plate 18, and having a pair of parallel, depending side portions 23 and 24. Similarly to the base means 11, the side portions 23 and 24 are also interconnected by a pair of connecting bars 25.

Referring to FIGS. 1–3 inclusive, the first and second articulated linkage units 13 and 14 are identical, and only one unit, 13, will be described, with like parts of unit 14 being identified by the same reference numeral with a prime added thereto. The unit 13 has an upper U-shaped element having an elongated back 26 extended laterally the width of the apparatus 10, with parallel, downwardly turned flanges 27 at each end. The unit 13 also has a lower U-shaped element having an elongated back 28 with upwardly turned flanges 29 at each end.

As the length of the lower back 28 is not quite as long as the upper back 26, the ends of the common flanges 27 and 29 are placed side-by-side, held in spaced conditions by spacer devices 33 (FIG. 3), and pivotally connected by connecting rods 30, leaving free upper flange ends 27a (FIG. 1) and free lower flange ends 27b, both free ends 27a and 27b pivotally connected, however, to outer ends of side portions 23 and 24 and of side plates 19, respectively.

Referring to FIG. 1, it will be clearly seen that the lower ends 27b of flanges 29 having projections 31 each offset angularly from the remainder of the flange 29, and the lower ends 27b' of flanges 29' have different projections 32 also offset angularly from the remainder of the flange 29'. Each pair of projections 31 and 32 on one side of the apparatus 10 are pivotally interconnected by a straight strap 36 (FIGS. 1 and 2), one end connected by pivot pin 37 to projection 31 and the other end by pivot pin 38 to projection 32. Counterclockwise movement, for example, of the left or first unit 13 as seen in FIG. 1, therefore causes clockwise movement of like degree — through the straps 36, of the right or second unit 14. Thus, the strap means 16 maintains the first and second units 13 and 14 in predetermined angularly related positions. The link means 41 comprises two identical pair of articulated links, each pair including substantially identical links 41 and 42 (FIGS. 1 and 2) having common, inner ends connected to a pivot 43 on each side portion 23, which pivot 43 is midway the length of said side portion 23 and intermediate the pivotal connections of said rods 25 and said side portion 23. The lower end of each link 41 is pivotally connected at 44 to a first unit flange 29, and the lower end of each other link 42 of each pair of pivotally connected at 46 to a second unit flange 29'.

Were imaginary lines to be drawn in FIG. 1 through the pivots 30, 44 and 21 of the first linkage unit 13, and through pivots 30', 46 and 2' of the second linkage unit, with the lines running through the base plate 18, it would be seen that the acute angles made therewith on the outer sides of the lines are equal. This predetermined angular relationship between the first and second units 13 and 14 is maintained by the provision of the straps 36 pivotally interconnected between the projections 31 and 32 of the linkage units' lower pairs of flanges 29 and 29'. Thus, the pivotal arcuate, opposite movements of the lower U-shaped elements of the linkage units 13 and 14 are equal, the acute angles being maintained equal.

Concurrently, the provisions of the link means 17 on each side of the apparatus 10 ensures the support portion 22 remaining level with the base plate 18, or putting it another way — parallel therewith, while retaining the longitudinal center of the support means 12 in a vertical plane. It will be noted from FIG. 1 that the pivots 44 and 46 at the lower outer ends of the links 41 and 42, respectively, are at identical and symmetrically located positions on the first and second linkage units 13 and 14, and that the common pivot 43 therebetween on the support side portions 23 is exactly midway the length of the support means 12. Thus, any tendency of the support means 12 to tilt about the pivot 43 so as to move out of a parallel condition with the base plate 18 is prevented. Also, any tendency to move longitudinally relative to the base plate 18 is prevented. By this arrangement, no arcuate movement of the seat support is permitted.

I claim:
1. Support apparatus for a seat comprising in combination:
   base means;
   U-shaped support means adapted to have a seat attached thereto and vertically movable relative to said base means, said support means being substantially rigid;
   first articulated linkage means pivotally connected between said base means and said support means;
   second articulated linkage means pivotally connected between said base means and said support means;
   strap means pivotally connecting said first means and said second means for maintaining said first and second means in predetermined angularly related positions during vertical movement of said support means; and
   link means including first and second links only, each link pivotally connected at one end directly to a said articulated means and at an opposite end directly to said support means, said opposite pivotal connection being horizontally immovable and operable in conjunction with said first and second means to maintain the pivotal connection of said link means with said support means in a vertical plane during movement of said support means.

2. Support apparatus as defined in claim 1, and wherein said support means comprises a U-shaped member having a flat upper portion to which the seat may be fastened, and a pair of depending side portions to each of which said first and second means are connected.

3. Support apparatus as defined in claim 2, and wherein said first and second means are identical, each comprising a pair of substantially identical U-shaped elements, each element having a back and a pair of parallel flanges at each end of said back, each back having a width less than the length of said flanges, ends of common flanges of said elements overlapped and pivotally connected such that a pair of opposite ends are free, a first pair of free ends pivotally connected to said base means and a second pair of free ends pivotally connected to said support means.

4. Support apparatus as defined in claim 3 wherein said link means includes two identical pair of articulated links, each pair including substantially identical links having common ends of said links pivotally interconnected to said side portion and with each free end pivotally connected to one of said linkage means, said pivotal connection of said first and second means with said support means being fixed against horizontal movement.

* * * * *